US012498212B2

(12) United States Patent
Berman et al.

(10) Patent No.: US 12,498,212 B2
(45) Date of Patent: Dec. 16, 2025

(54) TRACKING AND DETECTOR DEVICE FOR OPTICAL SYSTEMS

(71) Applicant: MACOM Technology Solutions Holdings, Inc., Lowell, MA (US)

(72) Inventors: Gregory M Berman, Ann Arbor, MI (US); Kevin R Lefebvre, Windham, NH (US)

(73) Assignee: MACOM Technology Solutions Holdings, Inc., Lowell, MA (US)

( * ) Notice: Subject to any disclaimer, the term of this patent is extended or adjusted under 35 U.S.C. 154(b) by 0 days.

(21) Appl. No.: 18/340,813

(22) Filed: Jun. 23, 2023

(65) Prior Publication Data

US 2023/0417537 A1   Dec. 28, 2023

Related U.S. Application Data

(60) Provisional application No. 63/355,346, filed on Jun. 24, 2022.

(51) Int. Cl.
*G01B 11/00* (2006.01)

(52) U.S. Cl.
CPC ................... *G01B 11/002* (2013.01)

(58) Field of Classification Search
CPC .. G02B 6/4224; G02B 6/1225; G02B 6/4236; G01B 11/002
See application file for complete search history.

(56) References Cited

U.S. PATENT DOCUMENTS

| 5,142,400 A | 8/1992 | Solinsky | |
| 5,349,176 A * | 9/1994 | Czichy | G01S 3/786 250/208.2 |
| 5,539,562 A * | 7/1996 | Morioka | H04B 10/1125 398/131 |
| 5,790,291 A * | 8/1998 | Britz | H04B 10/11 379/56.1 |
| 6,597,476 B1 | 7/2003 | Okorogu | |
| 6,804,422 B1 | 10/2004 | Bajorins | |
| 8,530,817 B1 * | 9/2013 | Smith | H01L 31/02024 250/208.2 |
| 9,973,274 B1 | 5/2018 | Graves | |

(Continued)

OTHER PUBLICATIONS

International Search Report and Written Opinion of the International Searching Aurhority; Oct. 17, 2023.

*Primary Examiner* — Georgia Y Epps
*Assistant Examiner* — Monica T Taba
(74) *Attorney, Agent, or Firm* — Jeffery J Brosemer

(57) ABSTRACT

A tracking detector device for use in a free-space optics (FSO) system includes a position sensor and an optical receiver coupled to the bottom surface of the position sensor. The position sensor has an optical aperture configured to allow a portion of incoming light to pass through the position sensor and a plurality of position receivers located adjacent to the optical aperture and configured to sense portions of the incoming light. The tracking detector device may also include a focusing optic disposed adjacent to the bottom surface of the position sensor and configured to focus the portion of the incoming light that passed through the position sensor onto the optical receiver. The tracking detector may advantageously be employed in FSO communications systems and provide fully automated alignment with an incoming light beam under computer control.

22 Claims, 15 Drawing Sheets

(56) References Cited

U.S. PATENT DOCUMENTS

| | | | |
|---|---|---|---|
| 2006/0177173 A1* | 8/2006 | Shastri | G02B 6/42 257/E31.095 |
| 2012/0043584 A1* | 2/2012 | Joshi | H10F 30/223 257/E31.115 |
| 2015/0185324 A1* | 7/2015 | Cooper | G01S 3/784 356/4.01 |
| 2017/0052334 A1* | 2/2017 | Graves | G02B 6/422 |
| 2018/0306991 A1* | 10/2018 | Epitaux | G02B 6/138 |
| 2021/0132306 A1* | 5/2021 | Krichevsky | G02B 6/4214 |
| 2022/0345221 A1* | 10/2022 | Mitchell | H04B 10/1121 |

* cited by examiner

TRACKING AND DETECTOR DEVICE FOR OPTICAL SYSTEMS

CROSS REFERENCE

This application claims the benefit of U.S. Provisional Patent Application Ser. No. 63/355,346 filed 24 Jun. 2022 the entire contents of which being incorporated by reference as if set forth at length herein.

TECHNICAL FIELD

The subject matter described herein relates to systems, methods, and structures providing integrated optical tracking and detection that may be utilized in a variety of optical systems including free space optics ("FSO") communications systems—among others.

BACKGROUND

The background description provided is to present a general context of the disclosure. Work of the inventor, to the extent it may be described in this background section, and aspects of the description that may not otherwise qualify as prior art at the time of filing are neither expressly nor impliedly admitted as prior art against the present technology.

Optical systems are essential for many technologies. As such, optical systems are used in a wide variety of applications, including astronomy, medicine, industry, and consumer electronics. Free-space optics generally refers to optical technologies that transmit modulated visible or infrared (IR) light beams through air or space from source to destination rather than guided through an optical waveguide, e.g., optical fiber. FSO communications is a communications technology that utilizes light propagating in free-space, e.g., air, vacuum, outer space, to wirelessly transmit data for communications such as computer networking. Moreover, the light, which may be in the form of an encoded visible or infrared (IR) beam, is directed towards a receiver. Upon receiving the encoded light beam, the receiver outputs an electric al signal, such as a digital signal, that represents data encoded in the received light. FSO communications systems are particularly useful where such waveguide optical connections are impractical due to high costs or other considerations.

However, as those skilled in the art will understand and appreciate, many optical systems—and FSO communications in particular—require proper alignment of an incoming light beam with respect to a receiver. If the alignment is not sufficient, the receiver may not be able to receive and digitize the incoming light beam, resulting in lost data and reduced bandwidth.

Prior art alignment approaches have utilized a beam splitter to split an incoming light beam into a first light beam used for communication purposes and a second light beam used for alignment purposes. The first light beam is directed towards a receiver that digitizes the incoming light beam for the communications purposes. The second light beam is directed towards another receiver that acts as an alignment sensor to determine an overall alignment of the beam. Based on this overall alignment information, one or more components of an optical assembly may be adjusted to change the alignment of the incoming beam. Unfortunately, such prior art approaches are complex optically and mechanically and require multiple beam paths for detection and alignment purposes.

SUMMARY

An advance in the art is made according to aspects of the present disclosure directed to an optical tracking and detector device for use in optical systems such as a FSO communication systems—among others. In sharp contrast to the prior art, optical systems including our inventive optical tracking and detector device exhibit position sensor elements that are configured to detect any misalignment of incoming/received light.

Viewed from a first illustrative aspect, the optical tracking and detector device according to aspects of the present disclosure generally includes a position sensor having an optical aperture configured to allow a portion of incoming light to pass through the position sensor; a plurality of position receivers positioned adjacent to the optical aperture, the plurality of position receivers configured to sense portions of the incoming light; and an optical detector configured to detect the portion of the incoming light that passes through the position sensor aperture.

Viewed from another—more specific, illustrative aspect, the optical tracking and detector device according to aspects of the present disclosure includes a position sensor, a focusing optic disposed adjacent to the position sensor, and an optical receiver device coupled to the bottom of the optical device. Advantageously, the optical receiver device could be any one of several different optical receiver devices, such as optical detectors, optical waveguides, and the like. The optical aperture is configured to allow a portion of incoming light to pass through, as well as a plurality of position receivers located adjacent to the optical aperture and configured to sense portions of the incoming light that strike a top surface of the position sensor. The focusing optic focuses the portion of the incoming light that passed through the position sensor onto the optical device.

In some embodiments, the optical tracking and detector device may advantageously be fabricated as a pair of sub-assemblies—including an upper sub-assembly and a lower sub-assembly. When so fabricated, a common upper sub-assembly may be paired with any one of several lower sub-assemblies each of which exhibit—for example—a specific detector type, a specific detector arrangement, or a specific optical coupling arrangement or combinations thereof.

In yet another illustrative example, a device for use in a FSO system includes a position sensor having an optical aperture extending from the top surface to a bottom surface of the position sensor and an optical detector coupled to a bottom surface of the position sensor. The position sensor also has a plurality of position receivers located adjacent to the optical aperture and configured to sense portions of the incoming light that strike the top surface of the position sensor. The optical aperture allows a portion of incoming light to pass through the position sensor and be received by the optical detector.

Further areas of applicability and various methods of enhancing the disclosed technology will become apparent from the description provided. The description and specific examples in this summary are intended for illustration only and are not intended to limit the scope of the present disclosure.

This SUMMARY is provided to briefly identify some of aspects of the present disclosure that are further described in the DESCRIPTION. This SUMMARY is not intended to identify key or essential features of the present disclosure, nor is it intended to limit the scope of any claims.

The term "aspects" is to be read as "at least one aspect". The aspects described above, and other aspects of the present disclosure described herein are illustrated by way of illustrative examples(s) and not limited to the accompanying drawing.

BRIEF DESCRIPTION OF THE DRAWING

A more complete understanding of the present disclosure may be realized by reference to the accompanying drawing in which.

Figure 1:
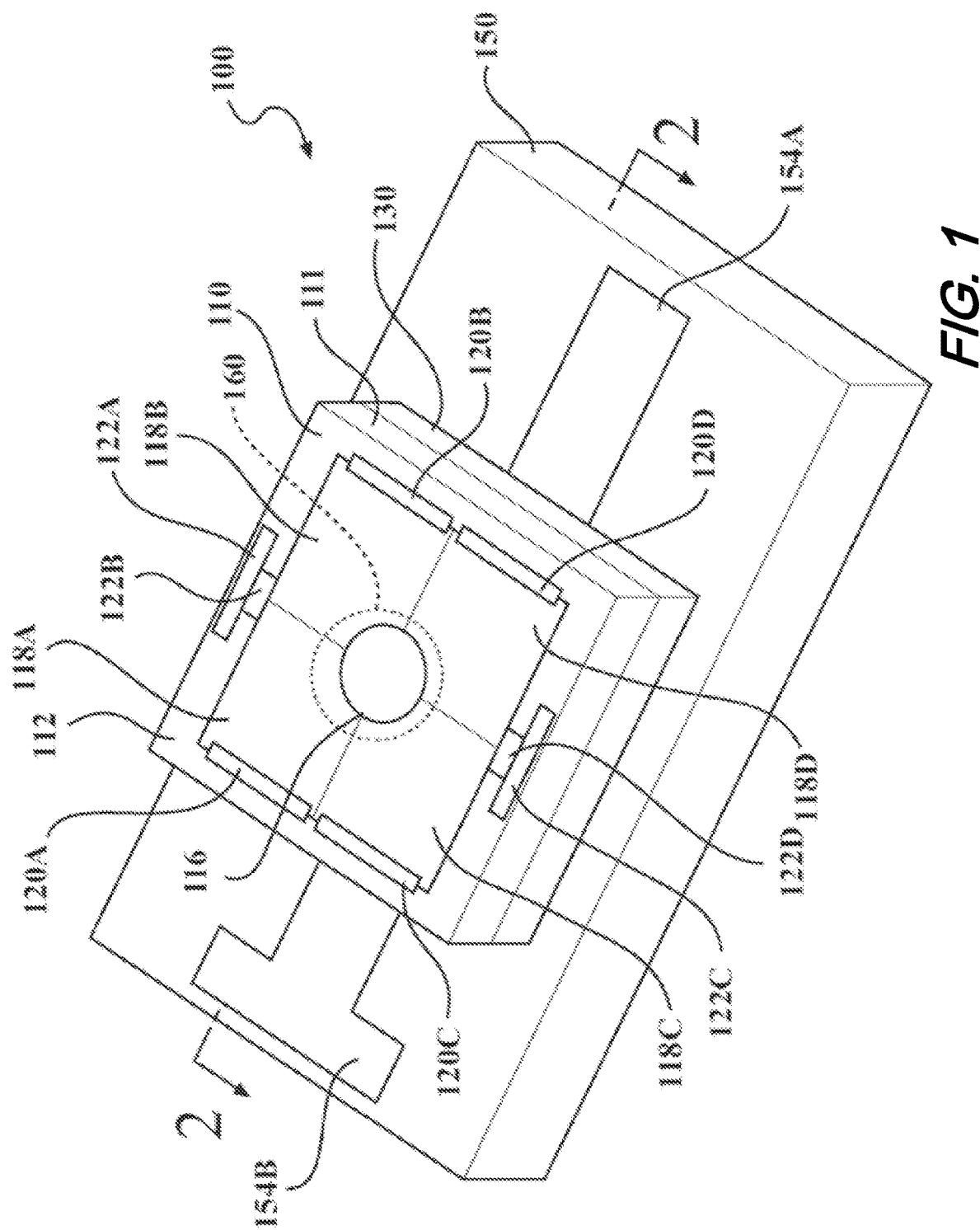
FIG. 1 is a perspective view of an illustrative tracking and detector device for optical systems according to aspects of the present disclosure.

The drawing figures, which are incorporated in and constitute a part of the specification, illustrate various systems, methods, and other illustrative embodiments of the disclosure. It will be appreciated that the illustrated element boundaries (e.g., boxes, groups of boxes, or other shapes) in the drawing figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DESCRIPTION

The following merely illustrates principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art and are to be construed as without limitation to such specifically recited examples and conditions.

Moreover, all statements herein reciting principles, aspects, and embodiments of the disclosure as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Described herein are devices that can be utilized with a variety of optical systems such as FSO systems. In particular, the devices described herein are designed to decrease the size, weight, cost, and complexity of an optical head for an optical system, for example, a FSO communications system.

Referring to FIG. 1, illustrated is a perspective view of one illustrative example of an illustrative device 100 that—as previously noted—may be utilized as part of a link or node in an FSO communications system. As its primary components in this example, device 100 includes a position sensor 110 attached to an optical detector unit 130. The optical detector unit 130—which may include a slab of InP or other suitable material along with a lens or other light-focusing/directing element—can be further coupled to a substrate 150, such as an alumina substrate or other type of substrate.

Figure 2:
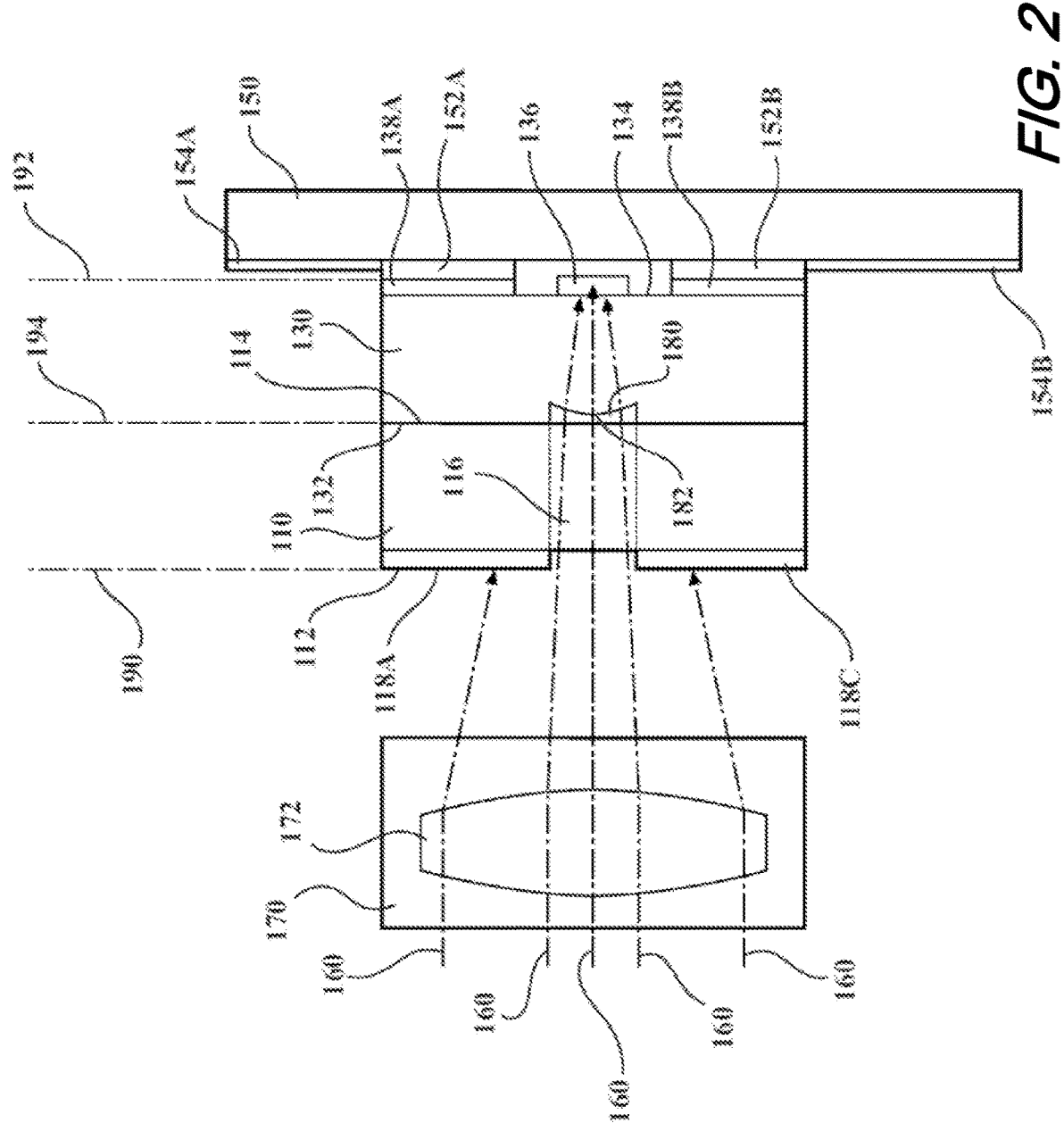
FIG. 2 is a cutaway view, taken along lines 2-2 of FIG. 1, of one illustrative example of the illustrative tracking and detector device for optical systems, wherein a focusing optic is located within the optical detector according to aspects of the present disclosure.

As illustratively shown, position sensor 110 is formed on a substrate 111, having a top surface 112 and a bottom surface 114 (best shown in FIG. 2). The position sensor 110 may be constructed from indium phosphide ("InP") or any other suitable material. When configured according to aspects of the present disclosure, position sensor 110 detects the relative alignment of a light beam 160 projected onto the top surface 112 of the position sensor 110 and thereby acts as an alignment sensor. Position sensor 110 may include a plurality of position receivers 118A-118D formed on the top surface 112 of position sensor 110. In particular, the position receivers 118A-118D may be in the form of a quad-cell detector. However, and as will be understood and appreciated by those skilled in the art, the position receivers 118A-118D may take any one of several different forms and arrangements.

Further still, while four position receivers 118A-118D are shown, any number of position receivers may be utilized in a variety of arrangements. For example, instead of a quad-cell arrangement such as illustratively shown, the arrangement may include any number individual position receivers such as hex-cell detector, (6 receivers), hepto-cell detector (7 receivers), octo-cell detector (8 receivers), etc. Additionally, such position receivers may be arranged in an inner/outer ring arrangement wherein an outer ring of position receivers may surround an inner ring of position receivers which in turn surround an aperture.

Further still, while four position receivers 118A-118D are shown, any number of position receivers may be utilized. In one illustrative example, position receivers 118A-118D may be in the form of PIN photodetectors and/or avalanche photodiodes ("APDs"). However, it should be understood any type of suitable photodetectors, or combinations thereof, may be utilized to act as the position receivers 118A-118D.

Each of the position receivers 118A-118D may have anode pads 120A-120D and cathode pads 122A-122D, respectively, also formed on the top surface 112 of the position sensor 110. The anode pads 120A-120D are connected to the anodes of the position receivers 118A-118D, respectively, while the cathode pads 122A-122D are connected to the cathodes of the position receivers 118A-118D, respectively. In some cases, the anode pads 120A-120D or the cathode pads 122A-122D may be connected to each other. However, in these situations, only one of the anode pads 120A-120D or the cathode pads 122A-122D may be connected to one another.

Signals output by the position receivers 118A-118D can be utilized to determine a general alignment of the light beam 160. The light beam 160 is a light beam that has been encoded to communicate information optically over a free space. The free space acts as a communication channel that allows the transmission of information from one location to another. In some cases, the free space may be in the form of a gas, such as air, or a vacuum, such as outer space. As those skilled in the art will understand and appreciate, the general alignment of the light beam 160 is important because if the light beam 160 is not aligned correctly, detection may be imperfect, and information encoded within the light beam 160 may be lost.

As best shown in FIG. 2, located within position sensor 110 is aperture 116, which allows a portion of the light beam 160 to pass through the position sensor and be received by the optical detector 130. As will be described in more detail, aperture 116 may be an InP substrate with an antireflection coating or other sufficiently optically transparent material, depending upon the transmission wavelength of the light beam 160. In one illustrative example, the aperture 116 may be made from the same material used to form the substrate of the position sensor 110, such as InP. Alternatively, the aperture 116 may be an empty cavity. In another illustrative example, the aperture may have straight sidewalls such that an entrance and exit are the same diameter or have tapered sidewalls such that an entrance has a greater diameter than an exit. As will be explained later, aperture 116 allows portions of the light beam 160 to pass through the position sensor 110 and be received by the optical detector 130.

Advantageously, aperture 116 may be located within position sensor 110 such that portions of the aperture 116 adjacent to the top surface 112 of the position sensor 110 are adjacent to the position receivers 118A-118D. Moreover, since the alignment of the light beam 160 should be such that the light beam 160 is projected to the aperture 116, surrounding the aperture 116 with position receivers 118A-118D allows for a determination regarding if the alignment of the light beam 160 with respect to the aperture 116 is proper and/or desired.

For example, in situations where the position receivers 118A-118D are a quad-cell, the general alignment of the light beam 160 can be determined based on the comparison of the signals output from the position receivers 118A-118D. For example, as illustratively shown in FIG. 1, the displacement of the light beam 160 in x-direction (left/right) is the signal difference from the signal outputs of the position receivers 118A and 118C minus the signal outputs of the position receivers 118B and 118D divided by the total signal outputs. This x displacement (xdisp) can be expressed as follows:

$$xdisp = \frac{(\text{Sum of Signals from } 118A \text{ and } 118C) - (\text{Sum of Signals from } 118B \text{ and } 118D)}{(\text{Sum of Signals from } 118A, 118B, 118C \text{ and } 118D)}$$

Similarly, the displacement of the light beam 160 in the y-direction (up/down) is the signal difference from the signal outputs of the position receivers 118A and 118B minus the signal outputs of the position receivers 118C and 118D divided by the total signal outputs. This y displacement (ydisp) can be expressed as follows:

$$ydisp = \frac{(\text{Sum of Signals from } 118A \text{ and } 118C) - (\text{Sum of Signals from } 118C \text{ and } 118D)}{(\text{Sum of Signals from } 118A, 118B, 118C \text{ and } 118D)}$$

Once the general displacement of the light beam 160 is determined, an optical assembly 170, which may include one or more optical components 172, can be adjusted to better project the light beam 160 onto the top surface 112 of the position sensor 110 so that enough light from the light beam 160 reaches and optical receiver and the optical detector unit 130 via the aperture 116. Those skilled in the art will understand and appreciate that a "sufficient amount of light" for the optical receiver and/or optical detector is merely a detectable amount of light from which data may be extracted and/or informational determinations may be made.

The optical components 172 making up the optical assembly 170 can include any one of a number of different optical components and combinations thereof. As such, the optical components 172 can include lenses, diffusers, etc., as well as actuators that can effectively change the projection of the beam 160 by adjusting the optical components 172.

The optical detector unit 130 that receives the light from the light beam 160 generally includes a top surface 132 and a bottom surface 134. Such optical detector unit may include a slab of InP or other suitable material along with a light focusing element including a lens.

Shown further in this figure is optical detector 136 which receives at least a portion of light that traverses the aperture and optical detector unit 130. Those skilled in the art will understand and readily appreciate that the optical detector 136 can be any type of optical detector, such as a PIN photodetector, an APD, a P-N junction device, a charge-coupled device detector, a cadmium sulfide photocell, a metal-semiconductor-metal ("MSM") detector, and the like. Additionally, optical detector 136 may include a plurality of PIN photodetectors, APDs, P-N junction devices, cadmium sulfide photocells, MSM, etc. and have such plurality arranged as a 1-dimensional or multi-dimensional array. When configured in this manner, information pertaining to light striking the optical detector 136 asymmetrically may be obtained and useful for certain applications such as determining a direction from which a light beam originates.

Similarly, an optical fiber or other optical receiver structure such as fiber or semiconductor waveguides may be employed to receive the light beam that traverses the aperture, with such received light being directed via the waveguide to another structure that may include an optical detector such as those noted above.

In this illustrative example, the optical detector 136 is an APD. As is known, APDs are highly sensitive semiconductor photodiode detectors that exploit the photoelectric effect to convert light into electricity. As such, APDs can convert received light portions of the light beam 160 into an electrical signal that represents data transported by the light beam 160. APDs may generally exhibit an absorber-multiplier structure wherein incident photons are absorbed in an absorber region and undergo avalanche multiplication in the multiplication region.

In this illustrative example, the optical detector 136 includes contact pads 138A and 138B and a contact area. The contact pads 138A and 138B are connected to contact pads 152A and 152B, respectively, of the substrate 150. The contact pads 152A and 152B are connected to traces 154A and 154B, respectively, that may be connected to other electrical components that can utilize the signals generated by the optical detector 130 in response to receiving the beam 160.

In this example, the top surface 132 of the optical detector unit 130 is directly adjacent to and attached to the bottom surface 114 of the position sensor 110. The optical detector unit 130 may be attached to the position sensor 110 through a number of different methodologies, such as using a low viscosity optical adhesive or utilizing a wafer bonding technique.

Additionally, to better project portions of the beam 160 received by the optical detector onto contact area 136, a focusing optic 180 may be utilized. In this example, the focusing optic 180 is positioned adjacent to the top surface 132 of the optical detector unit 130. Additionally, because it is located adjacent to the top surface 132 of the optical detector unit 130, the focusing optic 180 is also adjacent to the bottom surface 114 of the position sensor 110.

The focusing optic 180 may be coated with an anti-reflective coating 182. The antireflective coating 182 may match the index of refraction of any adhesive used to bond the position sensor 110 to the optical detector unit 130 and/or the index of refraction of air or whatever medium the light beam 160 is being transported through.

As illustratively shown in FIG. 2, the top surface 112 of the position receiver generally defines a first plane 190, while the bottom surface 134 of the optical detector unit 130 defines a second plane 192. A third plane 194 is generally defined by the bottom surface 114 of the position sensor 110 and/or the top surface 132 of the optical detector unit 130. The planes 190, 194 may be substantially parallel to one another.

In this illustrative example, the focusing optic 180 may be located anywhere between the first plane 190 and the second plane 192 such that the focusing optic 180 can focus portions of the light beam 160 that passed through the aperture 116 onto appropriate areas of the optical detector unit 130, such as the optical detector 136.

As such, in the example shown in FIG. 2, the focusing optic 180 may be integrated within portions of the die that forms the optical detector unit 130. In this example, the focusing optic 180 is located between the second plane 192 and the third plane 194 but is still located between the first plane 190 and the second plane 192.

However, the focusing optic 180 can be in other areas between the first plane 190 and the second plane 192. For example, referring to FIG. 3, another example of the device 100 is shown. The same reference numerals have been utilized to refer to the same components. Any previous description regarding these components is equally applicable to the example of the device 100 of FIG. 3.

Figure 3:
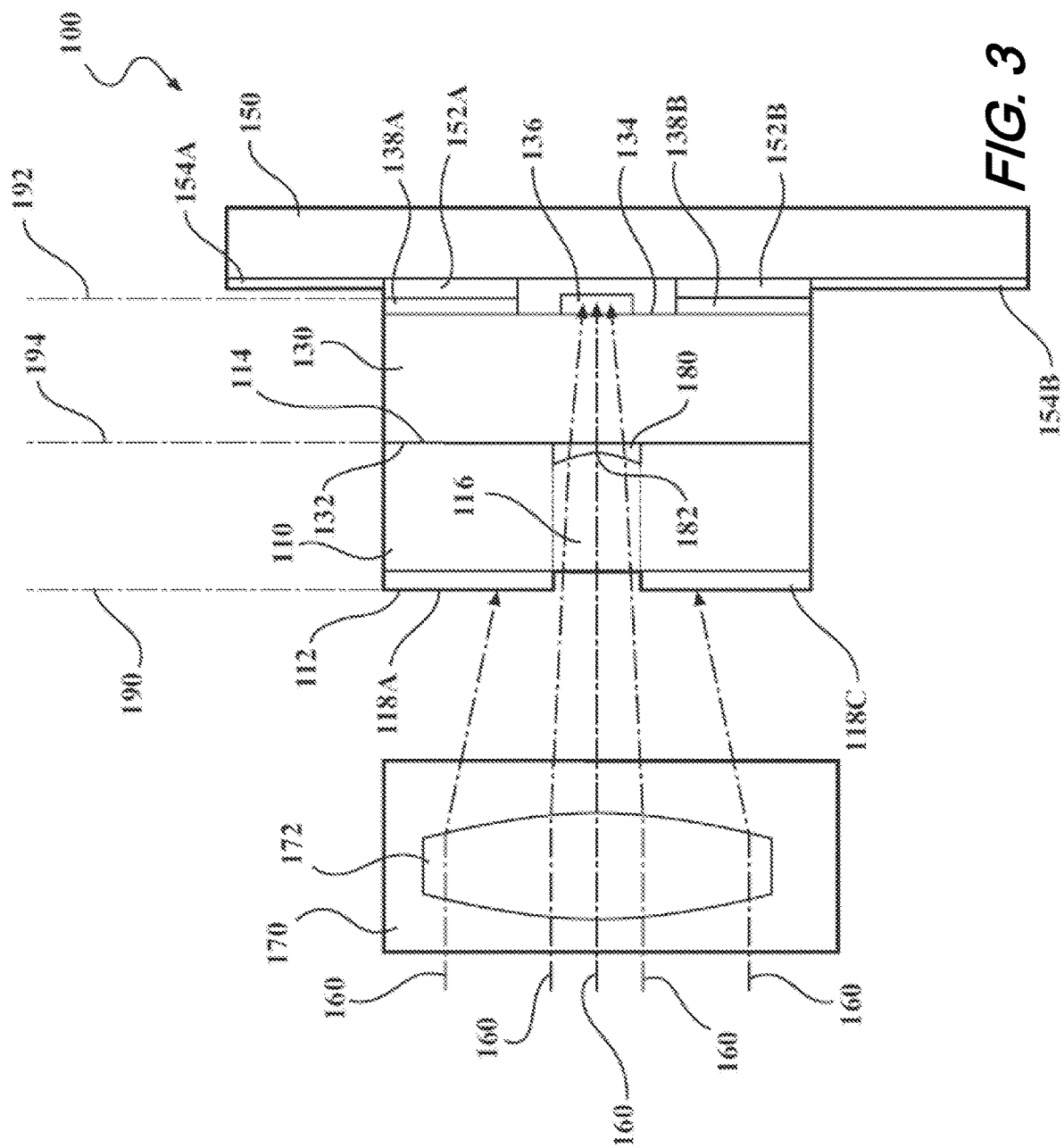
FIG. 3 is a cutaway view, taken along lines 2-2 of FIG. 1, of another illustrative example of the tracking and detector device for optical systems, wherein a focusing optic is located within the position sensor according to aspects of the present disclosure.

In the example of the device 100 of FIG. 3, the focusing optic 180 is still located between the first plane 190 and the second plane 192. However, in this example, the focusing optic 180 is located between the first plane 190 and the third plane 194. This differs from the example of FIG. 2, wherein the focusing optic 180 was located between the second plane 192 and the third plane 194. In the example of the device 100 of FIG. 3, the focusing optic 180 can be integrated within the die of the position sensor 110. Again, the purpose of the focusing optic 180 is to focus light that has been received by the aperture 116 onto the appropriate area of the optical detector unit 130, such as the optical detector 136.

Figure 4:
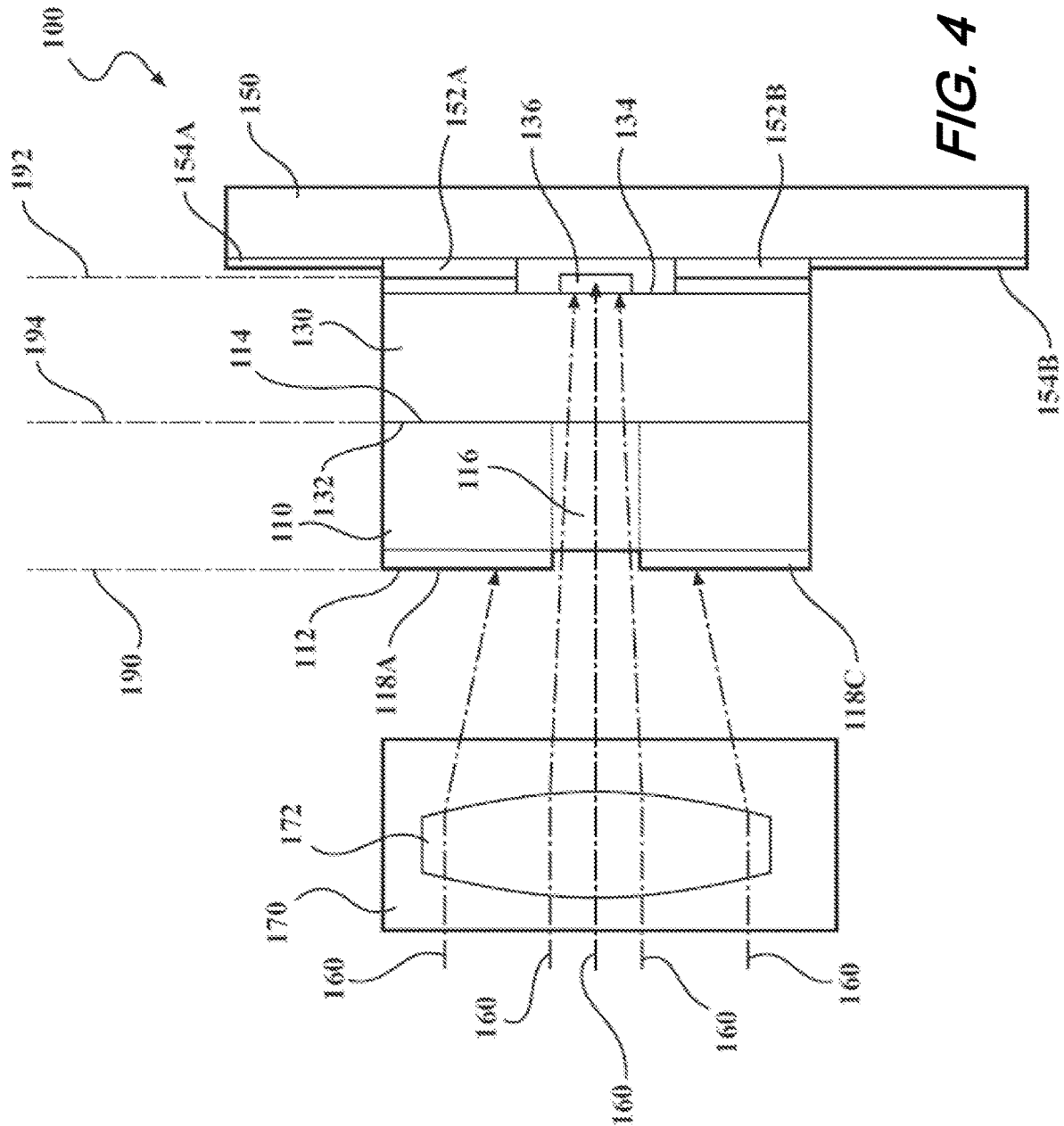
FIG. 4 is a cutaway view, taken along lines 2-2 of FIG. 1, of yet another illustrative example of the tracking and detector device for optical systems that does not utilize a focusing optic according to aspects of the present disclosure.

Referring now to FIG. 4, there is shown another illustrative example of device 100. Like before, the same reference numerals have been utilized to refer to the same components. As such, any previous description regarding these components is equally applicable to the example of the device 100 of FIG. 4. The device 100 of FIG. 4 foregoes the use of the focusing optic 180 altogether. Moreover, due to the closeness of the position sensor 110 with respect to the optical detector 130, the distance that the light beam travels after exiting aperture 116 is short. Due to the short distances, in this example, portions of the light beam 160 that pass through the aperture 116 can be directly projected onto appropriate portions of the optical detector unit 130, such as the optical detector 136, without intervening optics located between the first plane 190 and the second plane 192. Of course, this can vary from application to application. In some applications, the focusing optic 180 may be desirable as it may improve the functioning of the optical detector unit 130. In other applications, the focusing optic 180 can be foregone altogether.

While the illustrative example shown in FIGS. 1-4 illustrate examples wherein the position sensor 110 is directly adjacent and/or attached to the optical detector unit 130, it is noted that the position sensor 110 need not be directly adjacent and/or attached to the optical detector unit 130. For example, FIG. 5 illustrates another example of device 100.

Like before, the same reference numerals have been utilized to refer to the same components. As such, any previous description regarding these components is equally applicable to the example of device 100 of FIG. 5.

Figure 5:
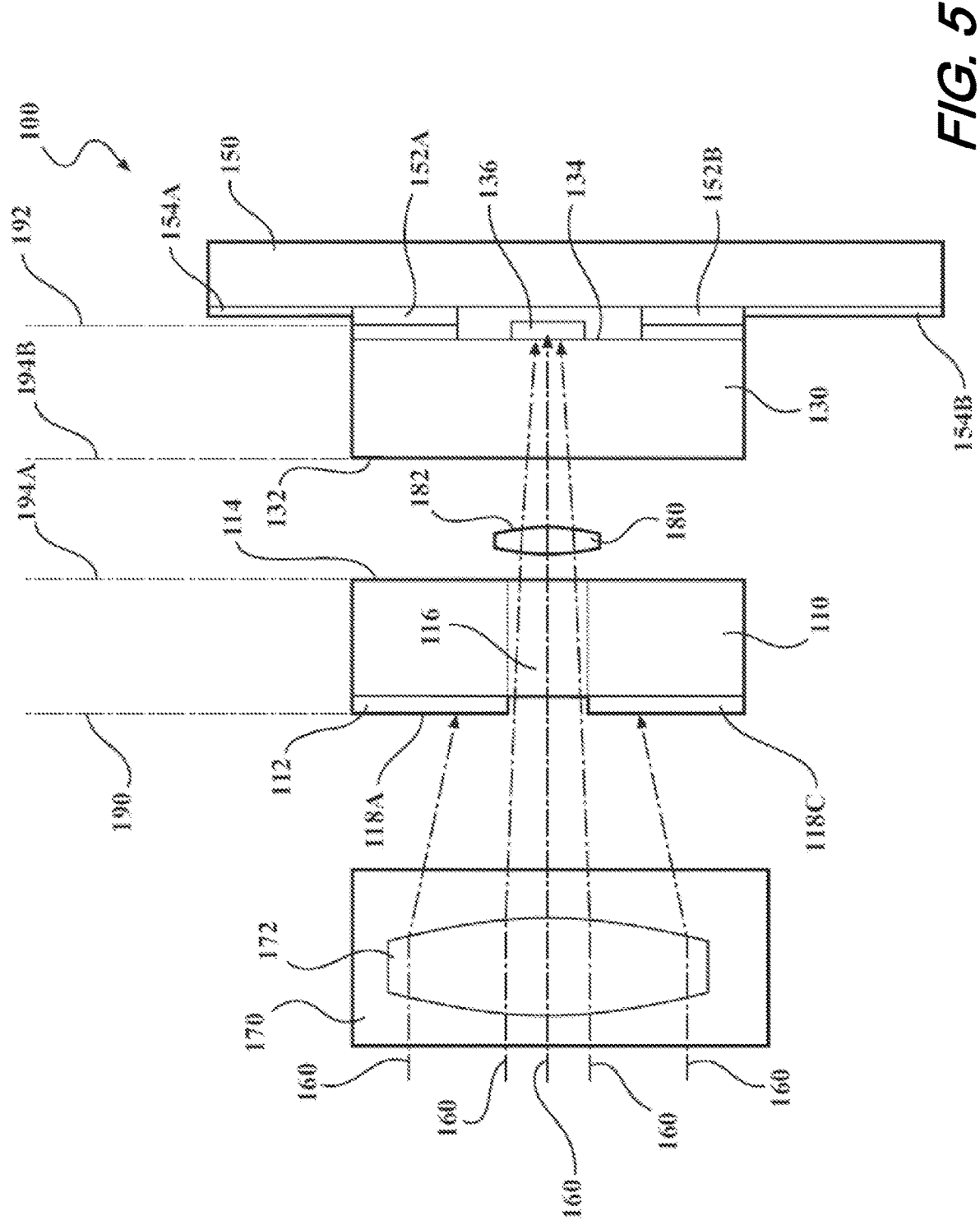
FIG. 5 is a side view of an illustrative tracking and detector device for optical systems that includes a position sensor and an optical device in the form of an optical detector and a focusing optic located between the position sensor and the optical device according to aspects of the present disclosure.

In the illustrative example of device 100 of FIG. 5, position sensor 110 is not connected to the optical detector unit 130. Portions of the light beam that pass-through position sensor 110 are focused onto the appropriate portion of the optical detector unit 130 using the focusing optic 180, which is shown to be separate from the position sensor 110 and the optical detector unit 130. In particular, the focusing optic 180, in this example, is located between a plane 194A, defined by the bottom surface 114 of the position sensor 110 and a plane 194B, defined by the top surface 132 of the optical detector unit 130. As such, the focusing optic 180 is still located between the first plane 190 and the second plane 192.

Additionally, while the focusing optic 180 is separated from the position sensor 110 and the optical detector 130 in this example, it is possible that the focusing optic 180 may be attached to the position sensor 110 and/or the optical detector unit 130. For example, the focusing optic 180 could be located between the first plane 190 and the plane 194A, defined by the bottom surface 114 of the position sensor 110 or could be located between the second plane 192 and the plane 194B, defined by the top surface 132 of the optical detector unit 130. Further still, while the focusing optic 180 is shown as a single lens, the focusing optic 180 could be broken up into several optical components located between the first plane 190 and the second plane 192.

The focusing optic 180 in this example could be freely positioned with respect to the position sensor 110 and/or the optical detector unit 130. Alternatively, the position of the focusing optic 180 in this example could be fixed based on the position of the position sensor 110 and/or the optical detector unit 130.

It is noted that the examples illustrated in FIGS. 1-5 show that portions of the light beam 160 pass through the aperture 116 of the position sensor 110 and are received by an optical detector unit 130. However, as mentioned earlier, optical detector unit 130 can be replaced with virtually any other type of optical device.

Figure 6:
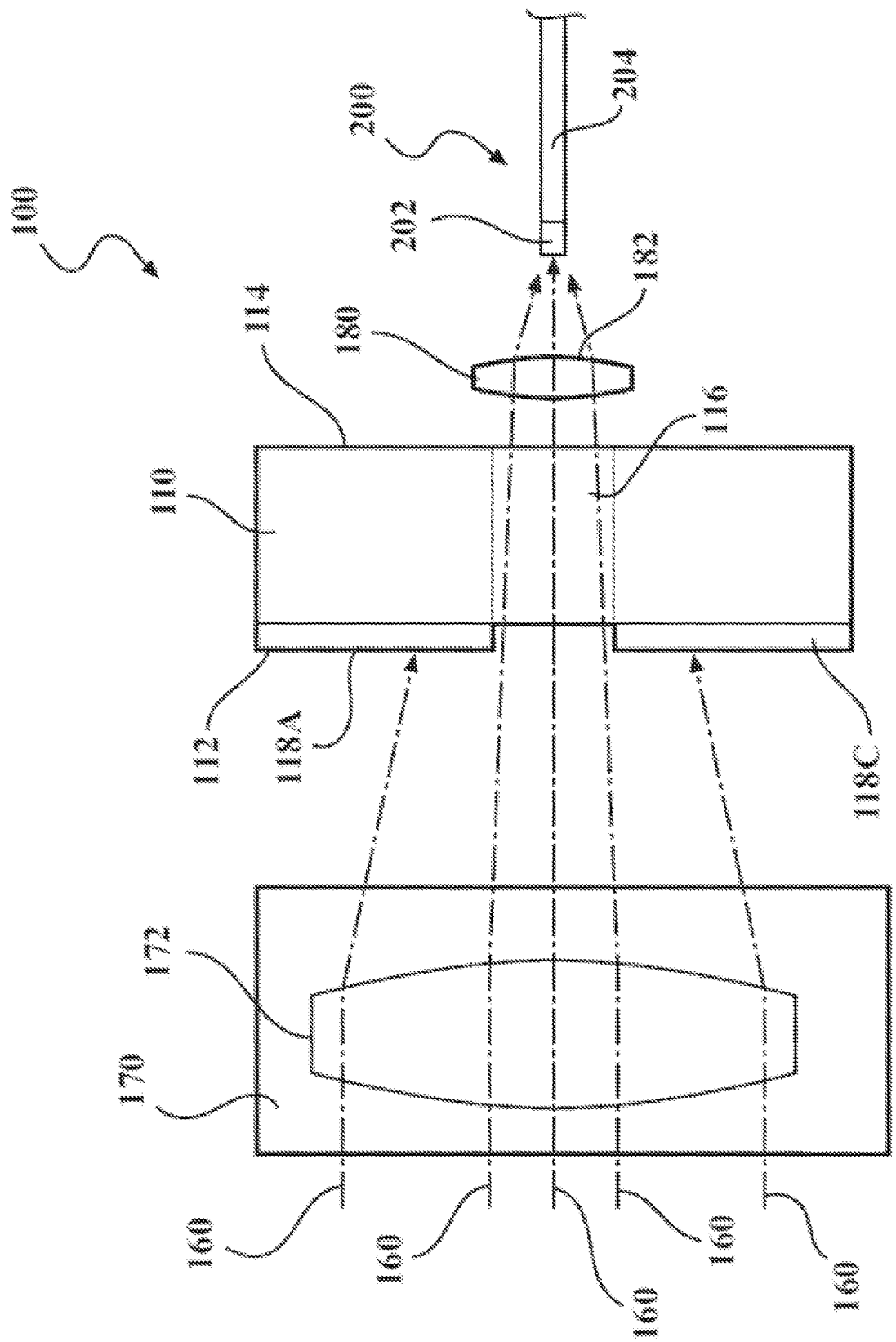
FIG. 6 is a side view of an illustrative tracking and detector device for optical systems that includes a position sensor and an optical device in the form of a fiber-optic assembly and a focusing optic located between the position sensor and the optical device according to aspects of the present disclosure.

For example, FIG. 6 illustrates another example of the device 100. Like before, the same reference numerals have been utilized to refer to the same components. As such, any previous description regarding these components is equally applicable to the example of the device 100 of FIG. 6.

In the example shown in FIG. 6, optical detector unit 130 has been replaced with a different optical device, in this case, an optical fiber assembly 200. In this illustrative example, the optical fiber assembly 200 can receive portions of the beam 160 that have passed through the position sensor 110. The optical fiber assembly 200 includes an optical coupler 202 connected to an optical fiber 204. The optical coupler 202, in coordination with the focusing optic 180, directs portions of the beam 160 that passed through the position sensor 110 into the optical fiber 204. The optical fiber 204 can be any type of optical fiber, such as single-mode optical fiber, hollow-core optical fiber, and the like.

The optical fiber 204 can then transport the light beam 160 to a different location. In particular, the optical fiber 204 may transport portions of the light beam 160 to an optical detector (not specifically shown) that can then convert the light beam 160 that was transported by the optical fiber 204 into an appropriate electrical signal.

Figure 7:
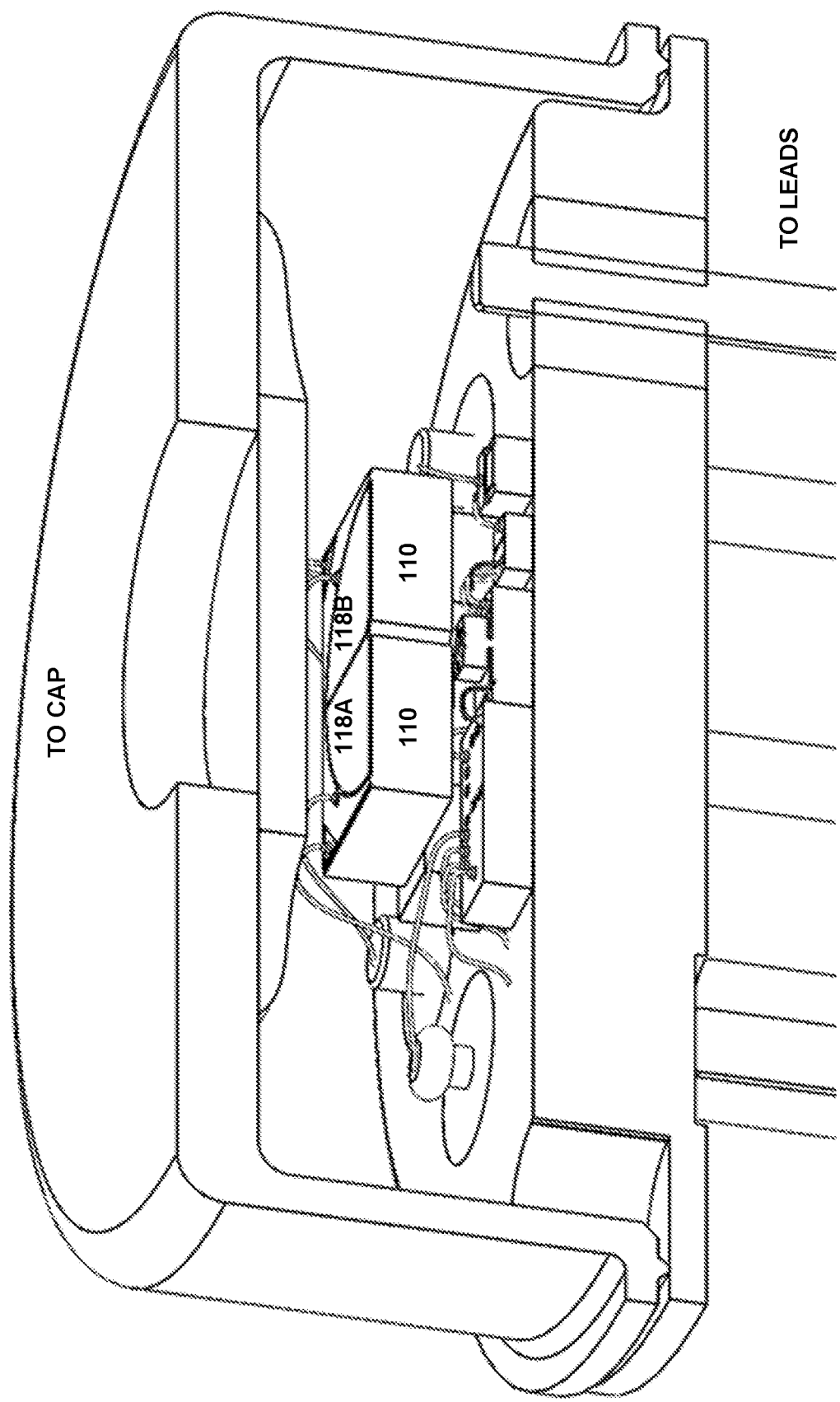
FIG. 7 is a cut-away view of an illustrative TO packaging including tracking and detector device for optical systems that includes a position sensor and detector according to aspects of the present disclosure.

FIG. 7 is a cut-away view of an illustrative TO packaging including tracking and detector device for free-space optical systems that includes a position sensor and detector according to aspects of the present disclosure. As illustratively shown in that figure, our tracking and detector device for free-space optical systems may be advantageously packaged into familiar shaped transistor outline packages that provide a robust, manufacturable package that is compatible with a variety of manufacturing technologies. Shown further in the figure is the relative position of the tracking and detector device relative to the TO cap and window that permits the entrance of a light beam that is subsequently tracked and detected.

Figure 8:
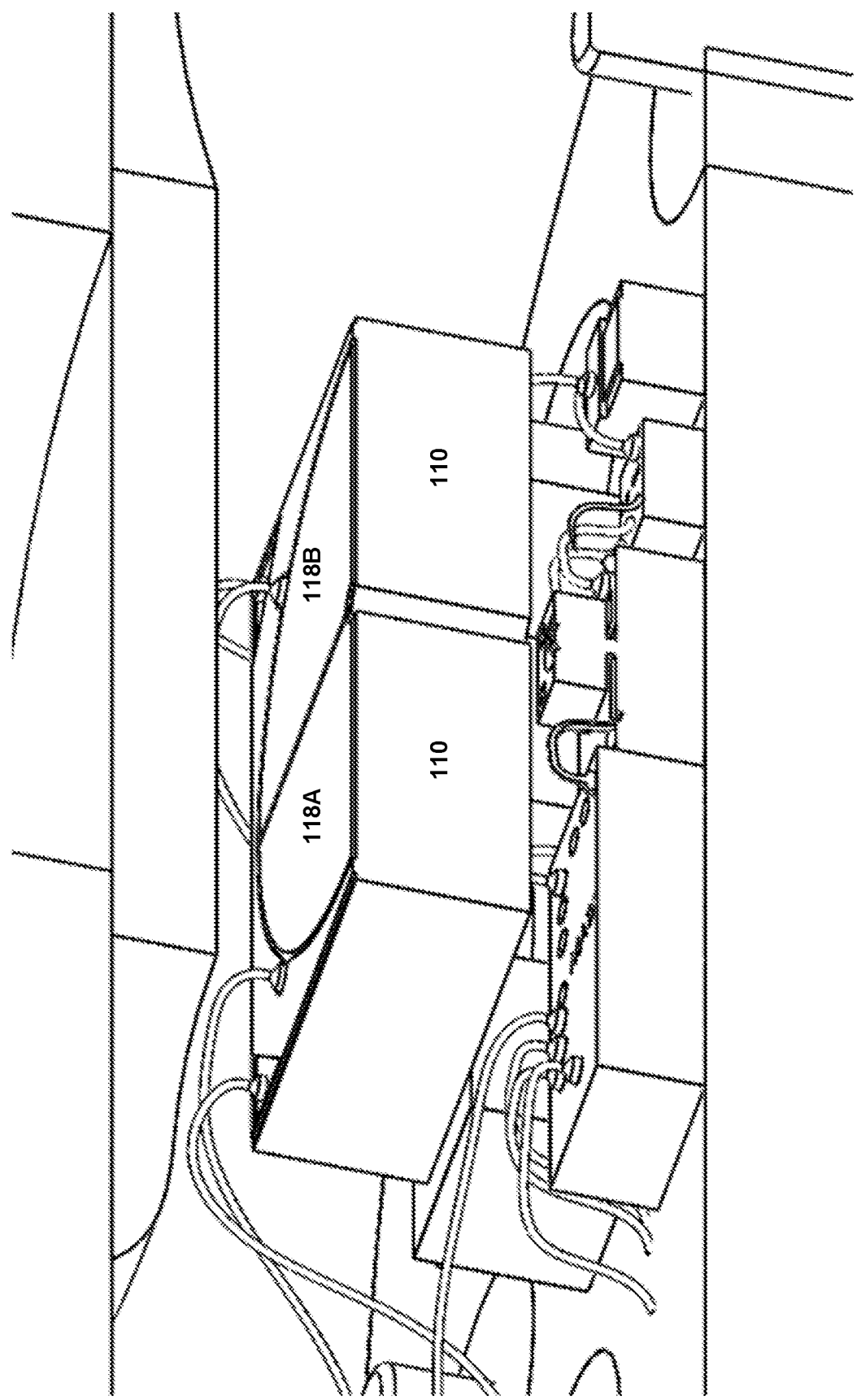
FIG. 8 is close-up of the cut-away view of FIG. 7 showing an illustrative TO packaging including tracking and detector device for optical systems that includes a position sensor and detector according to aspects of the present disclosure.

FIG. 8 is close-up of the cut-away view of FIG. 7 showing an illustrative TO packaging including tracking and detector device for free-space optical systems that includes a position sensor and detector according to aspects of the present disclosure.

Figure 9:
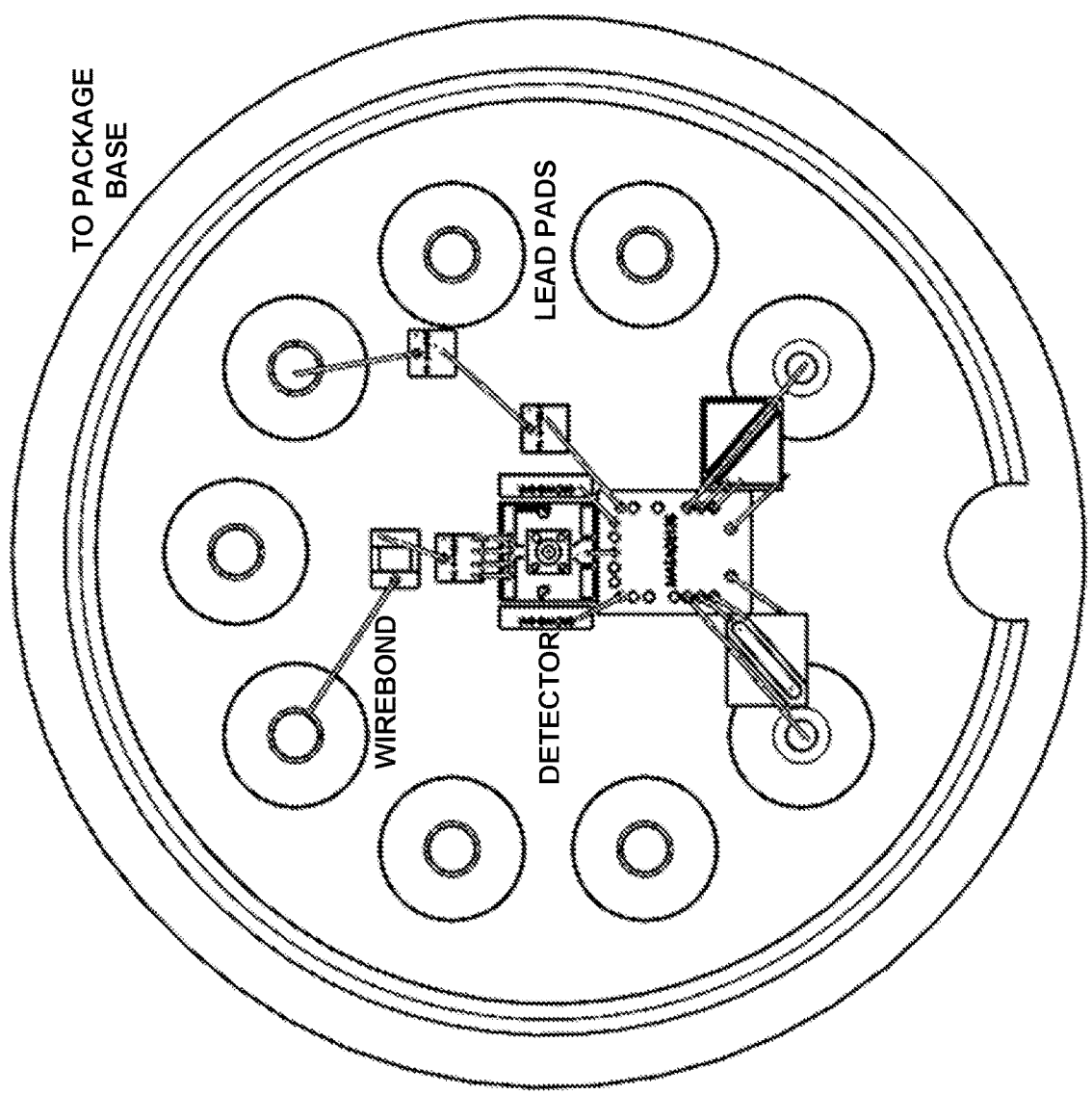
FIG. 9 is top view of an illustrative TO packaging with cap removed revealing a tracking and detector device for optical systems that shows a schematic of the detector and wire bonds to component and package leads according to aspects of the present disclosure.

FIG. 9 is top view of an illustrative TO packaging with cap removed revealing a tracking and detector device for free-space optical systems that shows a schematic of the detector and wire bonds to component and package leads according to aspects of the present disclosure.

Figure 10:
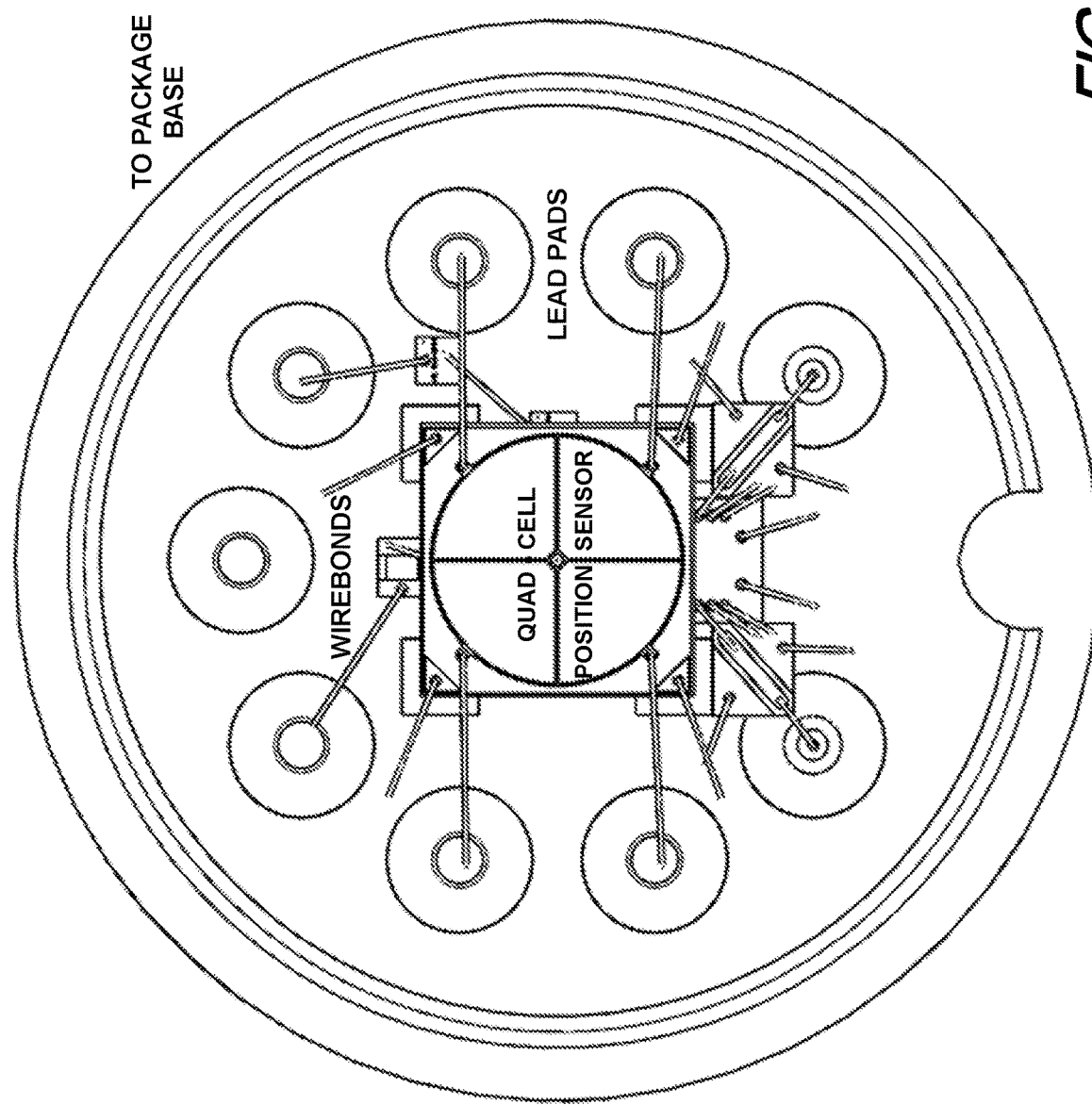
FIG. 10 is top view of an illustrative TO packaging with cap removed revealing a tracking and detector device for optical systems that shows a schematic of a quad-cell position sensor/detector and wire bonds to component and package leads according to aspects of the present disclosure.

FIG. 10 is top view of an illustrative TO packaging with cap removed revealing a tracking and detector device for free-space optical systems that shows a schematic of a quad-cell position sensor/detector and wire bonds to component and package leads according to aspects of the present disclosure.

Figure 11:
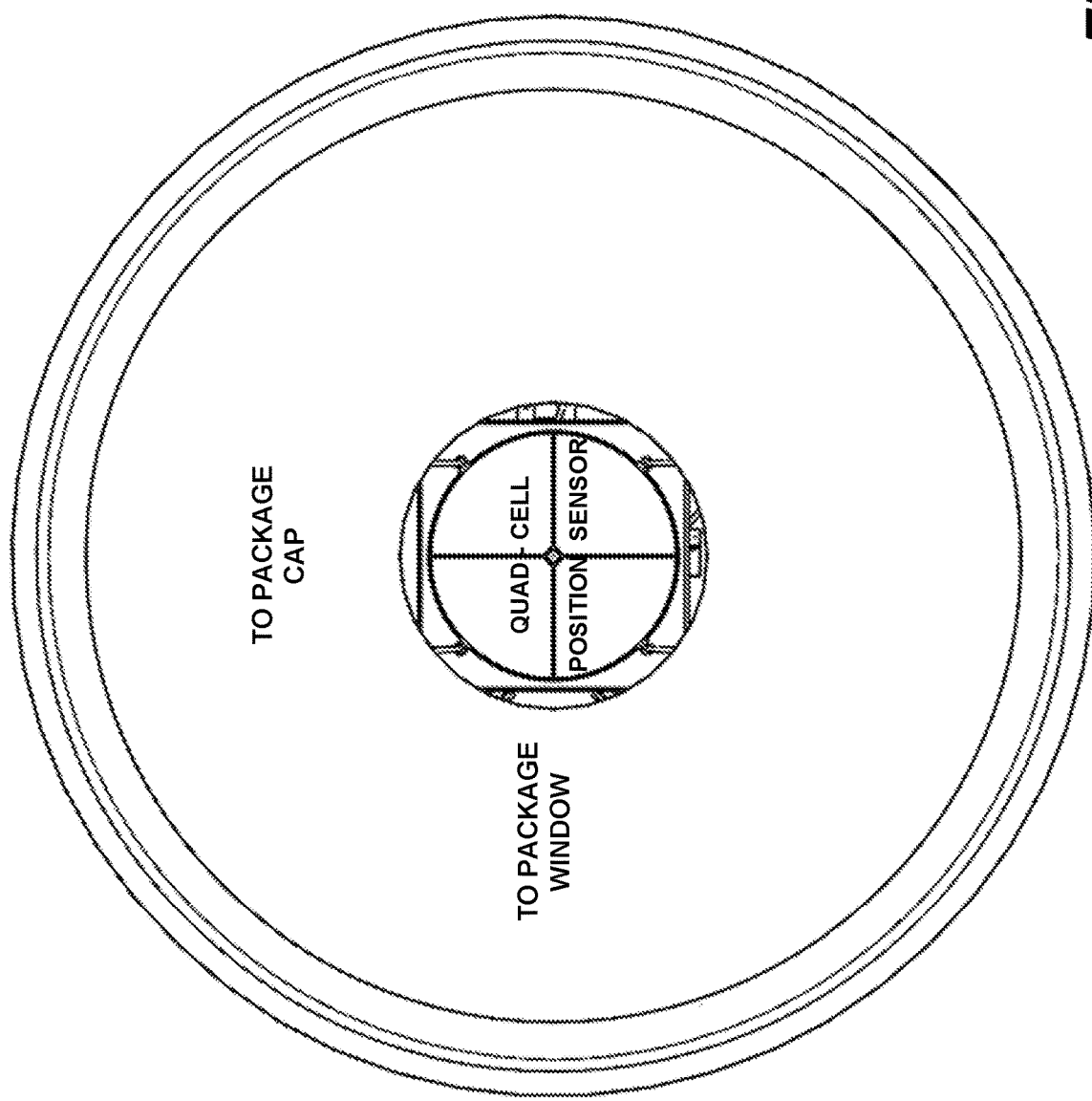
FIG. 11 is top view of an illustrative TO packaging including cap window/optic revealing a tracking and detector device for optical systems that shows a schematic of a quad-cell position sensor/detector and central aperture through which light beam is configured to be directed to an underlying light beam detector/sensor according to aspects of the present disclosure.

FIG. 11 is top view of an illustrative TO packaging including cap window/optic revealing a tracking and detector device for free-space optical systems that shows a schematic of a quad-cell position sensor/detector and central aperture through which light beam is configured to be directed to an underlying light beam detector/sensor according to aspects of the present disclosure.

Figure 12A:
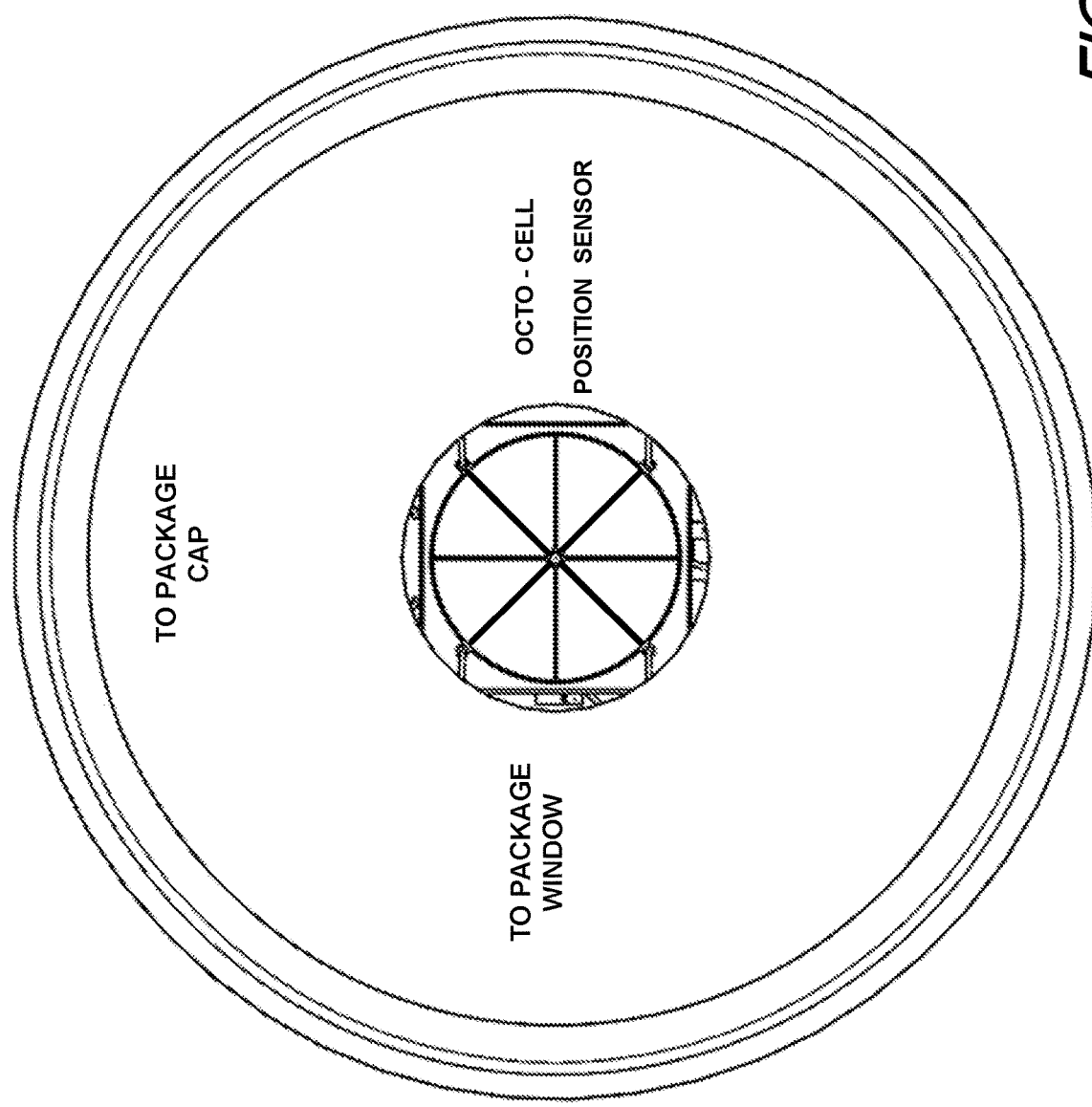
FIG. 12(A) is top view schematic of an illustrative octo-cell position sensor arrangement and FIG. 12(B) is a top view schematic of an illustrative inner-outer position sensor arrangement according to aspects of the present disclosure.
Figure 12B:
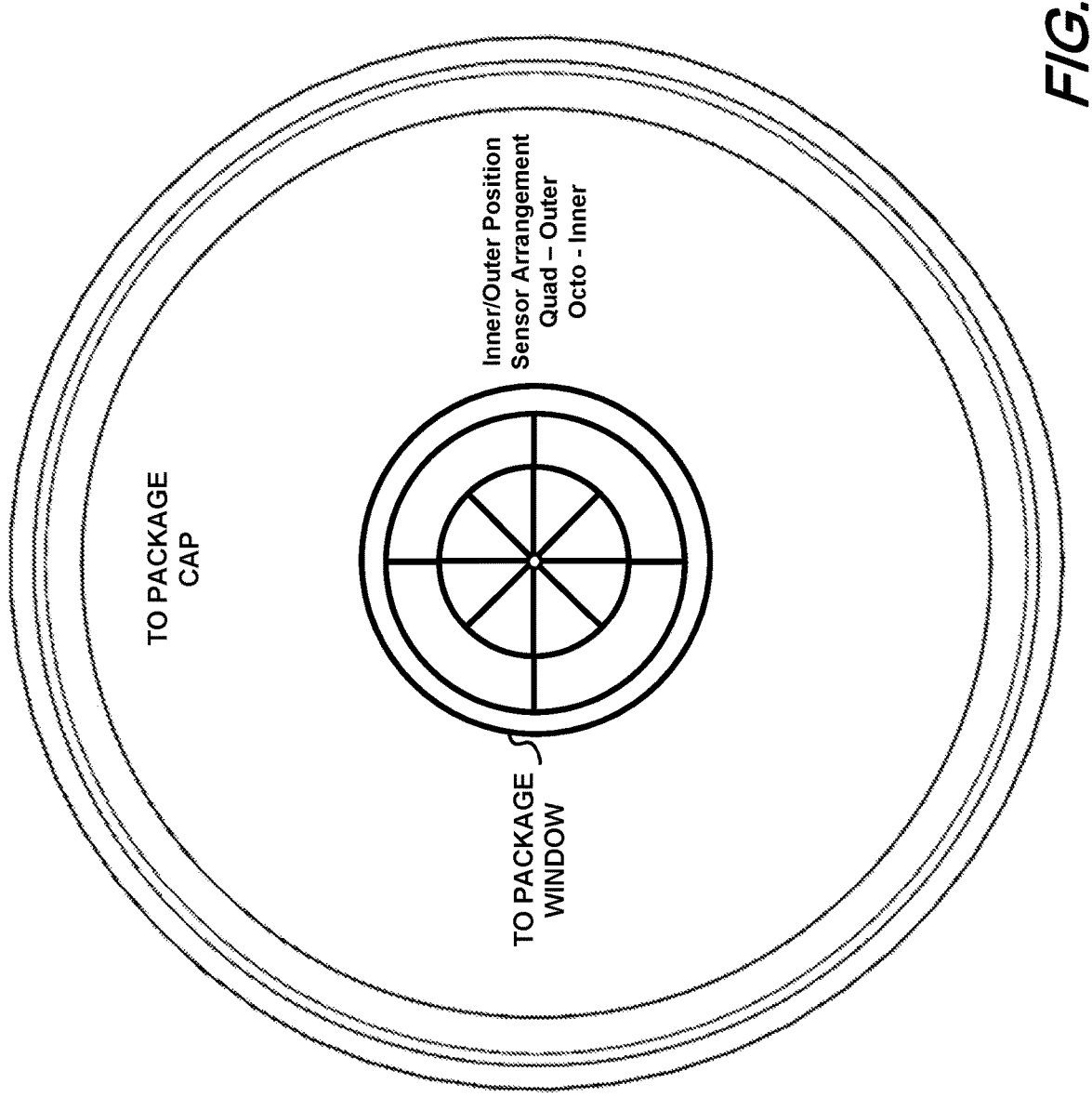

FIG. 12(A) is a top view schematic of an illustrative octo-cell position sensor arrangement and FIG. 12(B) is a top view schematic of an illustrative inner-outer position sensor arrangement according to aspects of the present disclosure. As illustratively shown in FIG. 12(A) an 8-segment octo-cell position sensor arrangement is employed and contained in a TO packaging. A TO package window formed in a TO package cap provides optical access to the position sensor contained therein. FIG. 12(B) shows an alternative position sensor arrangement namely and inner/outer ring arrangement where two position sensor "rings" are positioned substantially concentrically within a TO package. In this illustrative arrangement, the outer position sensor ring is a quad-cell arrangement while the inner ring is a octo-cell arrangement and surrounds the aperture. While not specifically shown from this view, the two concentric position sensor rings may be at the same elevation—or not—relative to an underlying optical receiver.

Figure 13:
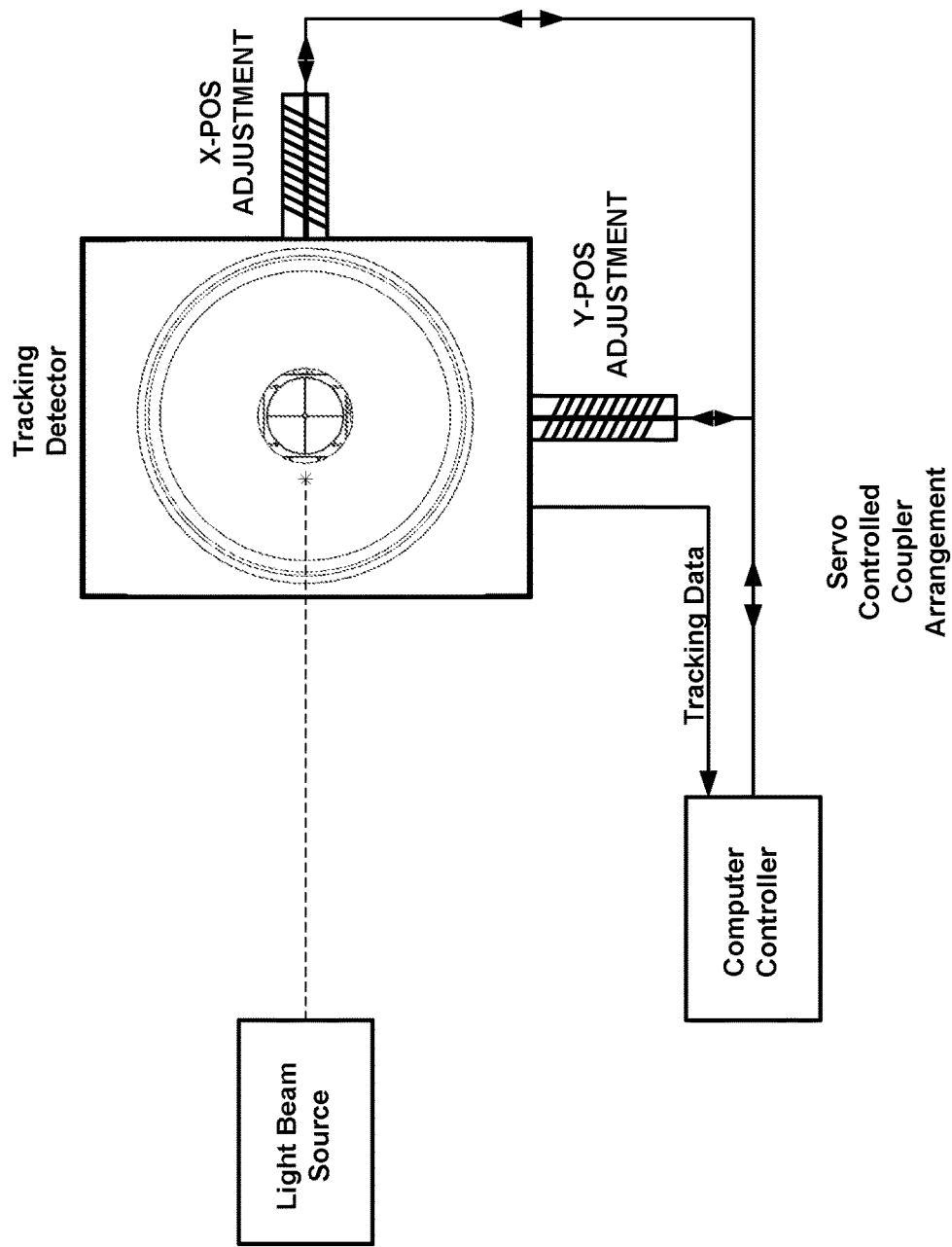
FIG. 13 is a schematic diagram of an illustrative free-space optical system including tracking and detector device for optical systems including servo-controlled coupler and controller configured to receive alignment information from the tracking and detector device and mechanically move the tracking and detector device to a desired location for reception of light beam according to aspects of the present disclosure.

FIG. 13 is a schematic diagram of an illustrative free-space optical system including tracking and detector device for free-space optical systems including servo-controlled coupler and controller configured to receive alignment information from the tracking and detector device and mechanically move the tracking and detector device to a desired location for reception of light beam according to aspects of the present disclosure. As illustratively shown in the figure, the tracking detector is shown positioned on X-Y positioning table or other adjustable structure that is under computer control. Operationally, the computer/controller receives tracking data from the tracking detector and interactively adjusts X and/or Y position of the tracking detector to desirably align a received light beam with a central aperture of the tracking detector.

As those skilled in the art will readily appreciate, such an arrangement may be employed in virtually any free-space optical arrangement where the alignment of a light beam with a detector is critically important including line-of-sight optical communications and applications thereof such as:

Backhaul—providing high-speed backhaul connections between data centers, cell towers and other network nodes;

Enterprise networks—providing connections between buildings or campuses as an alternative to fiber optic cable;

Wireless broadband—providing wireless broadband access to homes and businesses as an alternative to optical fiber, cable, and DSL;

Military and government—providing communications, surveillance, and targeting.

As those skilled in the art will readily appreciate, such free-space applications provide a number of advantages over other technologies including high bandwidth, low latency, and high reliability.

Figure 14:
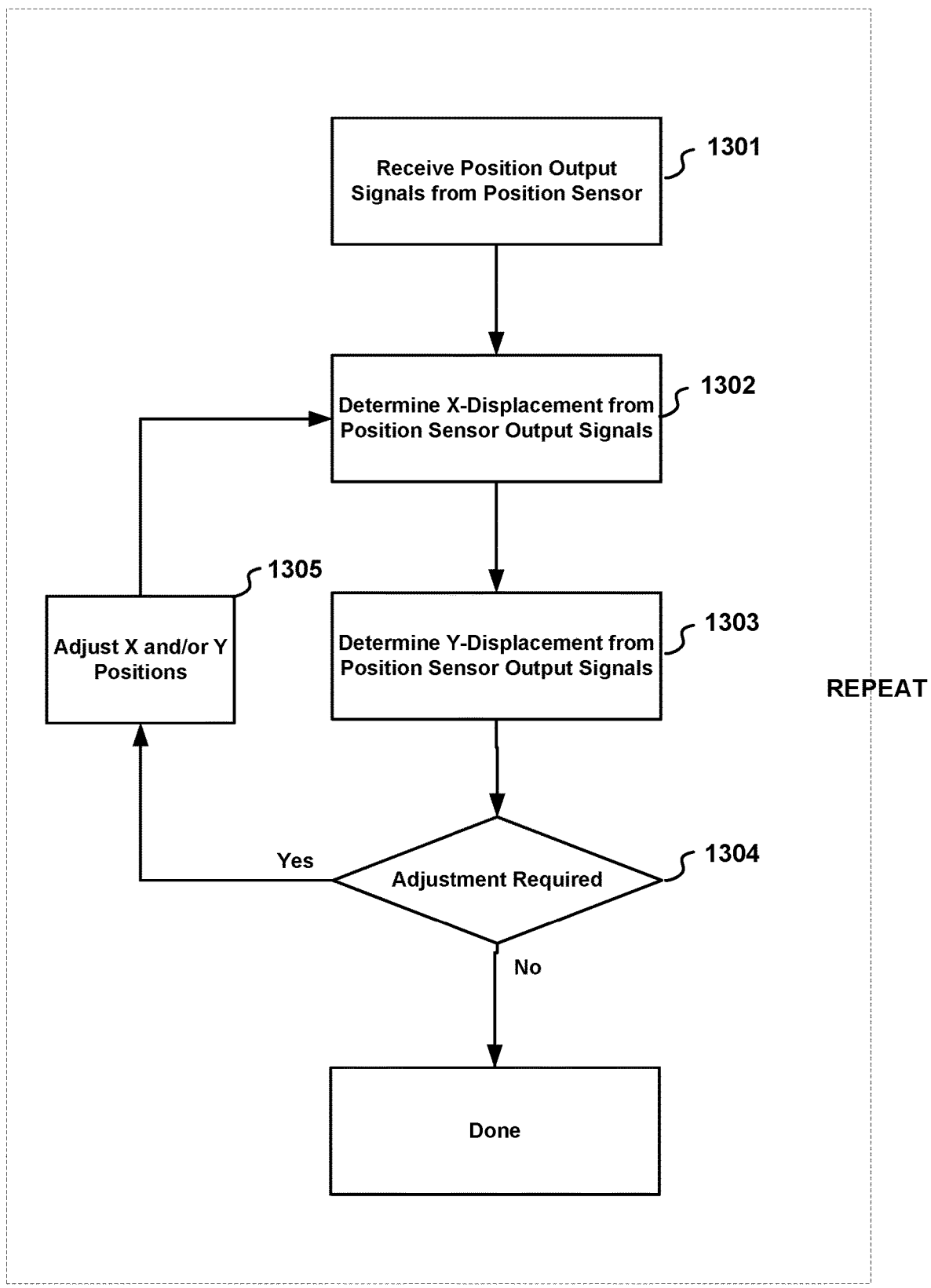
FIG. 14 is a schematic diagram of an illustrative method for controlling an optical system including tracking and detector device for optical systems including servo-controlled coupler and controller configured to receive alignment information from the tracking and detector device and mechanically move the tracking and detector device to a desired location for reception of light beam according to aspects of the present disclosure.

FIG. 14 is a schematic flow diagram of an illustrative method for controlling a free-space optical system including tracking and detector device for free-space optical systems including servo-controlled coupler and controller configured to receive alignment information from the tracking and detector device and mechanically move the tracking and detector device to a desired location for reception of light beam according to aspects of the present disclosure. As illustratively shown, a controller receives position output signals from position sensor at block 1301. At Block 1302, and Block 1303, X and Y displacement(s) is/are determined from the received position sensor output signals. At Block 1304, a determination is made whether X or Y position adjustment is required and, if so, at Block 1305, the X and/or Y positions of the sensor/detector is/are adjusted. The process repeats until no further adjustment is necessary. This overall process is repeated such that a desired alignment is continuously realized.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The following includes definitions of selected terms employed herein. The definitions include various examples and/or forms of components that fall within the scope of a term and may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a feature, structure, characteristic, property, element, or limitation, but that not every embodiment or example necessarily includes that feature, structure, characteristic, property, element or limitation. Furthermore, repeated use of the phrase "in one embodiment" does not necessarily refer to the same embodiment, though it may.

The terms "a" and "an," as used herein, are defined as one or more than one. As used herein, the term "plurality" is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses all combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A tracking detector device for optical systems, the tracking detector device comprising:
    a position sensor including
        a position sensor optical aperture configured to allow a portion of incoming light to pass through the position sensor;
        a plurality of position receivers positioned adjacent to the position sensor optical aperture, the plurality of position receivers arranged in a plurality of concentric rings around the position sensor optical aperture, all the position receivers configured to sense portions of the incoming light; and
    an optical receiver configured to receive the portion of the incoming light that passes through the position sensor optical aperture, wherein the optical receiver includes an optical detector having a focusing optic integrated within a die that forms the optical detector such that the incoming light that passes through the position sensor optical aperture is focused on the optical detector;
    wherein the position sensor optical aperture is made from a material that is optically transparent to the incoming light, the position sensor optical aperture is made from a same material used to form a substrate of the position sensor, the position sensor optical aperture includes an anti-reflection coating, and the position sensor optical aperture has tapered sidewalls such that an entrance to the position sensor optical aperture has a greater diameter than an exit from the position sensor optical aperture.

2. The tracking detector device of claim 1, wherein the optical detector includes at least one of an avalanche photodiode and a photodetector.

3. The tracking detector device of claim 2, wherein the optical detector includes a plurality of photodiodes organized in an array.

4. The tracking detector device of claim 1, wherein the position sensor and the optical receiver are attached to each other using an adhesive, solder, or a wafer bonding technique.

5. The tracking detector device of claim 1, further comprising a plurality of contact pads disposed on a top surface of the position sensor, the plurality of contact pads being electrically connected to the plurality of position receivers.

6. The tracking detector device of claim 1, wherein the plurality of position receivers are at least one of PIN photodiodes or avalanche photodiodes.

7. The tracking detector device of claim 1 including n position receivers that are configured in a multi-cell arrangement, where n>2.

8. The tracking detector device of claim 1, wherein the optical receiver has a top surface and a bottom surface, the top surface of the optical receiver is positioned adjacent to a bottom surface of the position sensor; and the bottom surface of the optical detector includes a plurality of contact pads electrically connected to the optical detector.

9. The tracking detector device of claim 1, further comprising a focusing optic integrated with at least one of the position sensor and the optical receiver.

10. The tracking detector device of claim 9 wherein the optical receiver is configured to receive the portion of the incoming light that passes through the position sensor optical aperture, wherein the focusing optic is located within the position sensor optical aperture such that the incoming light that passes through the position sensor optical aperture is focused on the optical detector.

11. The tracking detector device of claim 1, wherein a portion of a top surface of the position sensor is divided into separate sections, and each of the plurality of position receivers is located in one of the separate sections to detect incoming light striking the top surface of the position sensor.

12. The tracking detector device of claim 1, wherein the position sensor is configured to interoperate with different optical receiver configurations.

13. An optical communications system including the tracking detector device of claim 1.

14. The optical communications system of claim 13 wherein the tracking detector device is positionally adjustable such that a light beam may be axially aligned with the aperture by adjusting the position of the tracking detector device.

15. The optical communications system of claim 14 wherein the adjustment of the position of the tracking detector device is in response to portions of the light beam sensed by the position sensors.

16. The optical communications system of claim 15 wherein the determining a response to portions of the light beam sensed by the position sensors and adjustment of the position of the tracking detector device are performed under computer control.

17. A tracking detector device for use in a free-space optics system, the device comprising:
a position sensor having a position sensor optical aperture extending from a top surface of the position sensor to a bottom surface of the position sensor, the position sensor optical aperture configured to allow a portion of incoming light to pass through the position sensor and a plurality of position receivers located adjacent to the optical aperture, the plurality of position receivers arranged in a plurality of concentric rings around the position sensor optical aperture, all the position receivers configured to sense portions of the incoming light that strike the top surface of the position sensor; an optical detector having a top surface and a bottom surface, wherein the top surface of the optical detector is coupled to a bottom surface of the position sensor; and wherein the top surface of the position sensor and the bottom surface of the optical detector define substantially parallel planes;
wherein the optical detector includes a focusing optic integrated within a die that forms the optical detector such that the incoming light that passes through the position sensor optical aperture is focused on the optical detector; and
wherein the position sensor optical aperture is made from a material that is optically transparent to the incoming light; the position sensor optical aperture is made from a same material used to form a substrate of the position sensor, the position sensor optical aperture includes an anti-reflection coating, and the position sensor optical aperture has tapered sidewalls such that an entrance to the position sensor optical aperture has a greater diameter than an exit from the position sensor optical aperture.

18. The tracking detector device according to claim 17 wherein the plurality of position receivers substantially surrounds an entrance of the position sensor optical aperture.

19. The tracking detector device according to claim 18 including n position receivers where n>2, arranged in a multi-cell arrangement.

20. A method of operating a free-space optics (FSO) system, the method comprising:
providing the free-space optics system that receives an incoming light beam from free-space, the FSO system including a positionally adjustable tracking detector device including
a position sensor having
a position sensor optical aperture configured to allow a portion of incoming light to pass through the position sensor;
a plurality of position receivers positioned adjacent to the position sensor optical aperture, all the position receivers configured to sense portions of the incoming light; and an optical receiver configured to detect the portion of the incoming light that passes through the position sensor optical aperture, wherein the optical receiver includes an optical detector having a focusing optic integrated within a die that forms the optical detector such that the incoming light that passes through the position sensor optical aperture is focused on the optical detector;
wherein the position sensor optical aperture is made from a material that is optically transparent to the incoming light, the position sensor optical aperture is made from a same material used to form a substrate of the position sensor, the position sensor optical aperture includes an anti-reflection coating, and the position sensor optical aperture has tapered sidewalls such that an entrance to the position sensor optical aperture has a greater diameter than an exit from the position sensor optical aperture;
the method comprising:
determining an alignment of the optical receiver in response to one or more of the position receivers sensing portions of the incoming light; and
adjusting positionally the tracking detector in response to the alignment determination.

21. The method of operating a free-space optics (FSO) system according to claim 20 wherein the alignment determining and positionally adjustment is automatically performed under the control of a computer/controller.

22. The method of claim 20 wherein the optical receiver is configured to receive the portion of the incoming light that passes through the position sensor optical aperture, wherein the focusing optic is located within the position sensor optical aperture such that the incoming light that passes through the position sensor optical aperture is focused on the optical detector.

* * * * *